United States Patent
Shibahara et al.

(10) Patent No.: US 9,478,003 B2
(45) Date of Patent: Oct. 25, 2016

(54) DISPLAY DRIVER SORTING DISPLAY DATA FOR OUTPUT TO A DISPLAY PANEL

(71) Applicant: Synaptics Japan GK, Tokyo (JP)

(72) Inventors: Hikaru Shibahara, Tokyo (JP); Hideaki Honda, Tokyo (JP); Hiroki Takeuchi, Tokyo (JP)

(73) Assignee: Synaptics Display Devices GK, Tokyo (JP)

( * ) Notice: Subject to any disclaimer, the term of this patent is extended or adjusted under 35 U.S.C. 154(b) by 0 days.

(21) Appl. No.: 14/491,989

(22) Filed: Sep. 20, 2014

(65) Prior Publication Data

US 2015/0097852 A1    Apr. 9, 2015

(30) Foreign Application Priority Data

Oct. 9, 2013 (JP) .................................. 2013-211550

(51) Int. Cl.
*G06T 1/60* (2006.01)
*G09G 3/36* (2006.01)
*G09G 3/32* (2016.01)
*G09G 3/20* (2006.01)

(52) U.S. Cl.
CPC ............... *G06T 1/60* (2013.01); *G09G 3/2096* (2013.01); *G09G 3/3275* (2013.01); *G09G 3/3688* (2013.01); *G09G 2310/0291* (2013.01); *G09G 2340/045* (2013.01); *G09G 2370/08* (2013.01)

(58) Field of Classification Search
CPC ............ G09G 2310/0291; G09G 2310/0294; G09G 2310/0297; G09G 2310/0235; G09G 2310/0205; G09G 2310/0208; G09G 2360/12; G09G 2360/121; G09G 2360/128; G09G 2300/0408; G09G 2370/08; G09G 3/3275; G09G 3/3291; G09G 3/3685; G09G 3/3688; G09G 3/2003; G09G 3/20; G09G 3/2074; G09G 2340/04; G09G 2340/045; G09G 5/373

See application file for complete search history.

(56) References Cited

U.S. PATENT DOCUMENTS

| | | | | |
|---|---|---|---|---|
| 5,619,225 A * | 4/1997 | Hashimoto | .......... | G09G 3/2011 345/88 |
| 6,445,372 B1 * | 9/2002 | Asai | .................... | G09G 3/3677 345/100 |
| 8,643,583 B2 * | 2/2014 | Yoshida | ............... | G09G 3/2085 345/100 |
| 2002/0008713 A1 * | 1/2002 | Toji | ...................... | G09G 3/3607 345/694 |
| 2009/0189881 A1 * | 7/2009 | Ooishi | ..................... | G09G 3/20 345/211 |
| 2011/0148827 A1 * | 6/2011 | Ishida | ................... | G09G 3/3688 345/204 |
| 2012/0068977 A1 * | 3/2012 | Ooga | ................... | G09G 3/3688 345/204 |
| 2012/0146963 A1 * | 6/2012 | Kim | ..................... | G09G 3/3648 345/204 |
| 2013/0050171 A1 * | 2/2013 | Tsai | ..................... | G09G 3/3648 345/212 |

FOREIGN PATENT DOCUMENTS

| | | |
|---|---|---|
| JP | 2011-133543 A | 7/2011 |
| JP | 2013-114116 A | 6/2013 |

*Primary Examiner* — Larry Sternbane
*Assistant Examiner* — Darlene M. Ritchie
(74) *Attorney, Agent, or Firm* — Miles & Stockbridge P.C.

(57) ABSTRACT

A display driver that receives display line data of plural display lines to perform drive control on a display panel includes a line memory for storing display line data which is supplied from the outside. The display driver includes a logic circuit that controls write and read-out of the display line data in and from the line memory, and sorts pixel data of the display line data using read out data from the line memory, to generate display drive data. Drive circuits drive the display panel in units of display lines based on the drive data which is output from the logic circuit. The drive circuits are separately arranged on both sides of the logic circuit and the line memory which are interposed therebetween. The storage capacity of the line memory corresponds to the number of lines smaller than the number of display lines of a display frame.

13 Claims, 7 Drawing Sheets

<INPUT DISPLAY LINE DATA>

<DISPLAY MAGNIFICATION – DISPLAY DRIVE DATA>

Fig.6

<INPUT DISPLAY LINE DATA>

DT_DISP

| Line | | | | | | | | | | | | |
|---|---|---|---|---|---|---|---|---|---|---|---|---|
| 1 | R11 | G11 | B11 | R12 | G12 | B12 | R13 | G13 | B13 | R14 | G14 | B14 |
| 2 | R21 | G21 | B21 | R22 | G22 | B22 | R23 | G23 | B23 | R24 | G24 | B24 |
| 3 | R31 | G31 | B31 | R32 | G32 | B32 | R33 | G33 | B33 | R34 | G34 | B34 |
| 4 | R41 | G41 | B41 | R42 | G42 | B42 | R43 | G43 | B43 | R44 | G44 | B44 |
| | S1 | S2 | S3 | S4 | S5 | S6 | S7 | S8 | S9 | S10 | S11 | S12 |

Fig.7

<VERTICAL, HORIZONTAL AND OBLIQUE MOVEMENT – DISPLAY DRIVE DATA>

DT_DRV

| Gate | | | | | | | | | | | | |
|---|---|---|---|---|---|---|---|---|---|---|---|---|
| 1 | R11 | | B11 | | G12 | | R13 | | B13 | | G14 | |
| 2 | G11 | G21 | R12 | R22 | B12 | B22 | G13 | G23 | R14 | R24 | B14 | B24 |
| 3 | R21 | R31 | B21 | B31 | G22 | G32 | R23 | R33 | B23 | B33 | G24 | G34 |
| 4 | G31 | G41 | R32 | R42 | B32 | B42 | G33 | G43 | R34 | R44 | B34 | B44 |
| | S1 | S2 | S3 | S4 | S5 | S6 | S7 | S8 | S9 | S10 | S11 | S12 |

Fig.9

<VERTICAL MOVEMENT – DISPLAY DRIVE DATA>

DT_DRV

| Gate | S1 | S2 | S3 | S4 | S5 | S6 | S7 | S8 | S9 | S10 | S11 | S12 |
|---|---|---|---|---|---|---|---|---|---|---|---|---|
| 1 | R11 |  | B11 |  | G12 |  | R13 |  | B13 |  | G14 |  |
| 2 | R21 | G11 | B21 | R12 | G22 | B12 | R23 | G13 | B23 | R14 | G24 | B14 |
| 3 | R31 | G21 | B31 | R22 | G32 | B22 | R33 | G23 | B33 | R24 | G34 | B24 |
| 4 | R41 | G31 | B41 | R32 | G42 | B32 | R43 | G33 | B43 | R34 | G44 | B34 |

Fig.10

<VERTICAL AND HORIZONTAL MOVEMENT – DISPLAY DRIVE DATA>

DT_DRV

| Gate | S1 | S2 | S3 | S4 | S5 | S6 | S7 | S8 | S9 | S10 | S11 | S12 |
|---|---|---|---|---|---|---|---|---|---|---|---|---|
| 1 | R11 |  | B11 |  | G12 |  | R13 |  | B13 |  | G14 |  |
| 2 |  | R21 | G11 | B21 | R12 | G22 | B13 | R23 | G13 | B23 | R14 | G24 | B14 |
| 3 | R31 | G31 | B31 | R22 | G32 | B22 | R33 | G23 | B33 | R24 | G34 | B24 |  |
| 4 |  | R41 | G31 | R41 | R32 | G42 | B32 | R43 | G33 | B43 | R34 | G44 | B34 |

Fig.11

<VERTICAL AND HORIZONTAL MOVEMENT – DISPLAY DRIVE DATA>

DT_DRV

| Gate | S1 | S2 | S3 | S4 | S5 | S6 | S7 | S8 | S9 | S10 | S11 | S12 |
|---|---|---|---|---|---|---|---|---|---|---|---|---|
| 1 |  | R11 |  | B11 |  | G12 |  | R13 |  | B13 |  | G14 |  |
| 2 | R21 | G11 | B21 | R12 | G22 | B12 | R23 | G13 | B23 | R14 | G24 | B14 |  |
| 3 |  | R31 | G21 | B31 | R22 | G32 | B22 | R33 | G23 | B33 | R24 | G34 | B24 |
| 4 | R41 | G31 | B41 | R32 | G42 | B32 | R43 | G33 | B43 | R34 | G44 | B34 |  |

DISPLAY DRIVER SORTING DISPLAY DATA FOR OUTPUT TO A DISPLAY PANEL

CROSS-REFERENCE TO RELATED APPLICATIONS

The Present application claims priority from Japanese application JP 2013-211550 filed on Oct. 9, 2013, the content of which is hereby incorporated by reference into this application.

BACKGROUND

The present invention relates to a display driver that performs drive control of a display panel, and particularly relates to a technique for sorting display line data which is supplied from a host device, for example, a technique effective in a case of application to a liquid crystal display driver.

Display drivers input display line data of a display frame from a host device, and drive signal lines using display line data based on the corresponding display line at a timing synchronized with scanning drive of display lines of a display panel. A gradation voltage selected by the corresponding display line data is used in driving the signal lines.

Some storage devices that receive display data from the host device are provided with a frame buffer memory as disclosed in, for example, JP-A-2013-114116. The frame buffer memory is provided, thereby allowing a large timing margin to occur in the supply of display data to a display timing through the host device. However, this is not likely to avoid an increase in the occupation area of the display driver due to the frame buffer memory, and does not respond to a request for a reduction in the size of the display panel with respect to a display area.

On the other hand, there is also a disclosure in which processing is performed by sequentially receiving display data from a host device as disclosed in JP-A-2011-133543 through multiple stages of line latches. The line latches have bits arrayed along a direction parallel to a drive terminal of a signal electrode.

SUMMARY

The inventor has examined a change of the array of display line data which is supplied from a host device at the display driver side. For example, there is a process of magnifying a display image, or a process of associating the array of pixel data with mapping of sub-pixels of pixels constituting a display panel. This is because a load is not imposed on the host device. In this case, a processing unit and a frame buffer memory are arranged in the display driver, and thus it is also possible to cope with the above problem by the processing unit performing read-modify-write on display data which is stored in the frame buffer memory. However, it was then obvious that the above configuration was not likely to respond to a request for a reduction in the size of the display panel due to an increase in the size of the display driver.

The present invention is to provide a display driver capable of changing the array of display data by itself while suppressing an increase in occupation area.

The above and other problems and novel features will be made clearer from the description and the accompanying drawings of the specification.

The following is a brief description of the summary of the representative embodiments of the invention disclosed in the application.

That is, a display driver that receives display line data of a plurality of display lines to perform drive control on a display panel includes a line memory for storing display line data which is supplied from the outside. The display driver includes a logic circuit that controls write and read-out of the display line data in and from the line memory, and sorts pixel data of the display line data using data which is read out from the line memory, to generate display drive data. Drive circuits drive the display panel in units of display lines on the basis of the drive data which is output from the logic circuit. The drive circuits are separately arranged on both sides of the logic circuit and the line memory which are interposed therebetween. The storage capacity of the line memory corresponds to the number of lines smaller than the number of display lines of a display frame.

The following is a brief description of an effect obtained by the representative embodiments of the invention disclosed in the application.

That is, the logic circuit and the line memory are used, thereby allowing the array of pixel data in display line data to be changed on the display driver side without requiring a complicated configuration for adding a large number of circuit elements to a narrow place in which the number of line latch stages which are arranged along drive terminals is increased or a large number of multiplexers are arranged in a transfer path between line latches, and without concern of an increase in occupation area in case that a frame memory is adopted.

BRIEF DESCRIPTION OF THE DRAWINGS

FIG. 6 is a diagram illustrating a portion of input display line data.

FIG. 7 is a diagram illustrating results of sorting in which vertical, horizontal and oblique movements of sub-pixel data are performed.

FIG. 9 is a diagram illustrating results of sorting in which vertical movement of sub-pixel data is performed.

FIG. 10 is a diagram illustrating results of sorting in which vertical and horizontal movements of sub-pixel data are performed.

FIG. 11 is a diagram illustrating results of other sorting in which vertical and horizontal movements of sub-pixel data are performed.

DETAILED DESCRIPTION

1. Summary of the Embodiments

Figure 1:
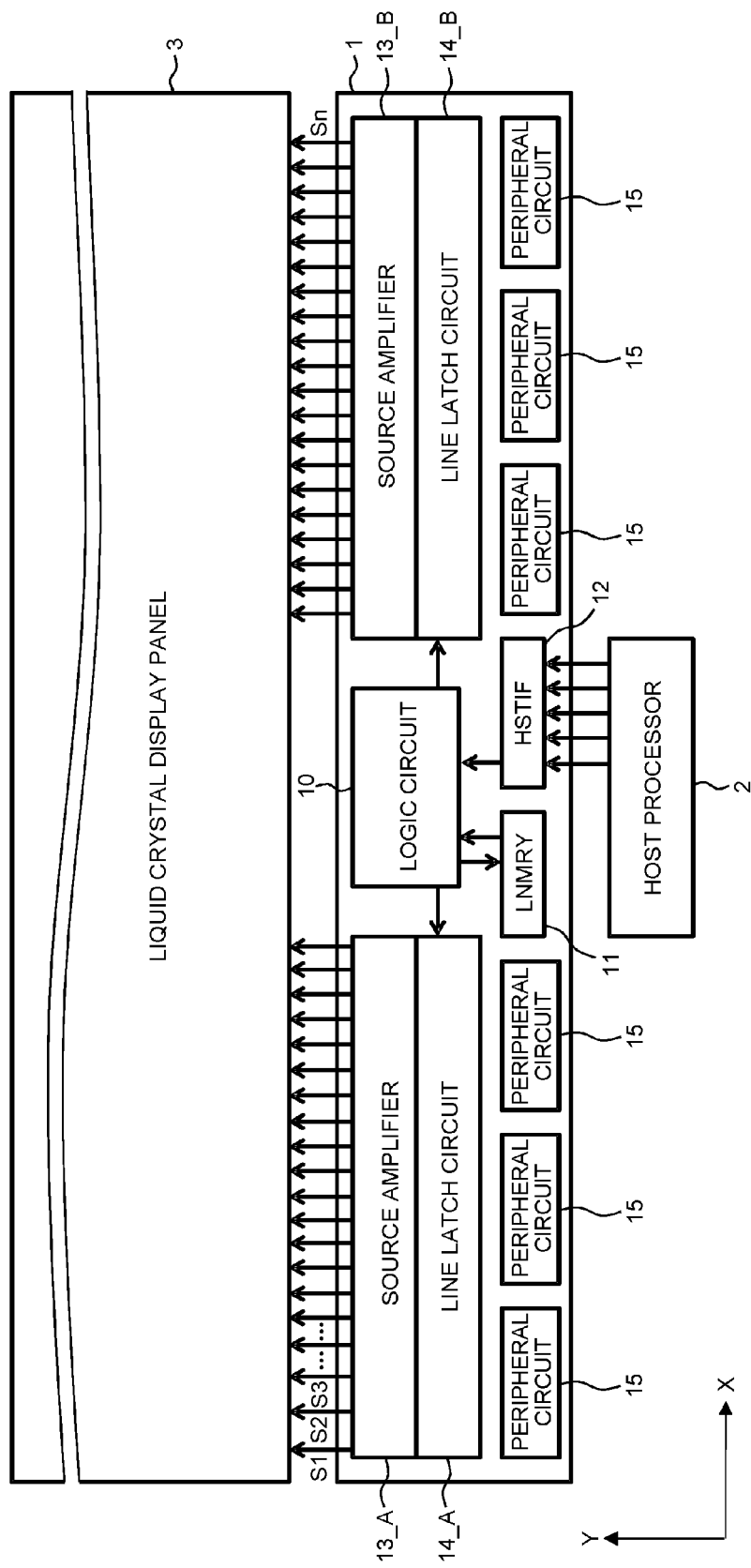
FIG. 1 is a block diagram illustrating an example of a display driver.

First, summary of representative embodiments of the invention disclosed in the application will be described. Reference numerals in drawings in parentheses referred to in description of the summary of the representative embodiments just denote components included in the concept of the components to which the reference numerals are designated.

[1] <<Line Memory and Logic Circuit>>

A display driver (1) that receives display line data (DT_DISP) of a plurality of display lines to perform drive control on a display panel (3) includes an input circuit that inputs display line data which is supplied from an outside, a line memory (11) capable of storing the display line data which is input to the input circuit, a logic circuit (10) that controls write and read-out of the display line data in and from the line memory, and sorts pixel data of the display line data using data which is read out from the line memory, to generate display drive data, and drive circuits (13_A, 13_B, 14_A, 14_B) that drive the display panel in units of display lines on the basis of the drive data which is output from the logic circuit. The drive circuits are separately arranged on both sides of the logic circuit and the line memory which are interposed therebetween. The line memory has a storage capacity corresponding to the number of lines smaller than the number of display lines of a display frame.

According to this, the logic circuit and the line memory are used, thereby allowing the sorting of the display line data to be performed without requiring a complicated configuration for adding a large number of circuit elements to a narrow place in which the number of line latch stages which are arranged along drive terminals is increased or a large number of multiplexers are arranged in a transfer path between line latches. In addition, it is possible to reduce a layout area as compared to a case where such a complicated configuration is adopted. Moreover, there is no concern of a considerable increase in occupation area as in case that a frame memory is adopted. Further, the array of the pixel data of the display line data can be changed on the display driver side. That is, it is possible to increase the degree of freedom of data processing on the display driver side, and to contribute to a reduction in a load of a host device.

[2] <<Sorting of Pixel Data in Accordance with Mapping of Sub-Pixels of Display Panel>>

In Paragraph 1, the logic circuit stores the display line data which is input to the input circuit in the line memory, and sorts the pixel data within the same display line or between adjacent display lines in units of display pixels, using the input display line data and display line data which is related to a display line immediately before the display line of the display line data and is read out from the line memory, to thereby associate an array of the pixel data with mapping of sub-pixels constituting pixels of the display panel (FIGS. 7 to 11).

According to this, the array of the pixel data can be associated with the mapping of the sub-pixels constituting the pixels of the display panel, in the display driver itself without imposing a load on the host device.

[3] <<Magnification>>

Figure 5:
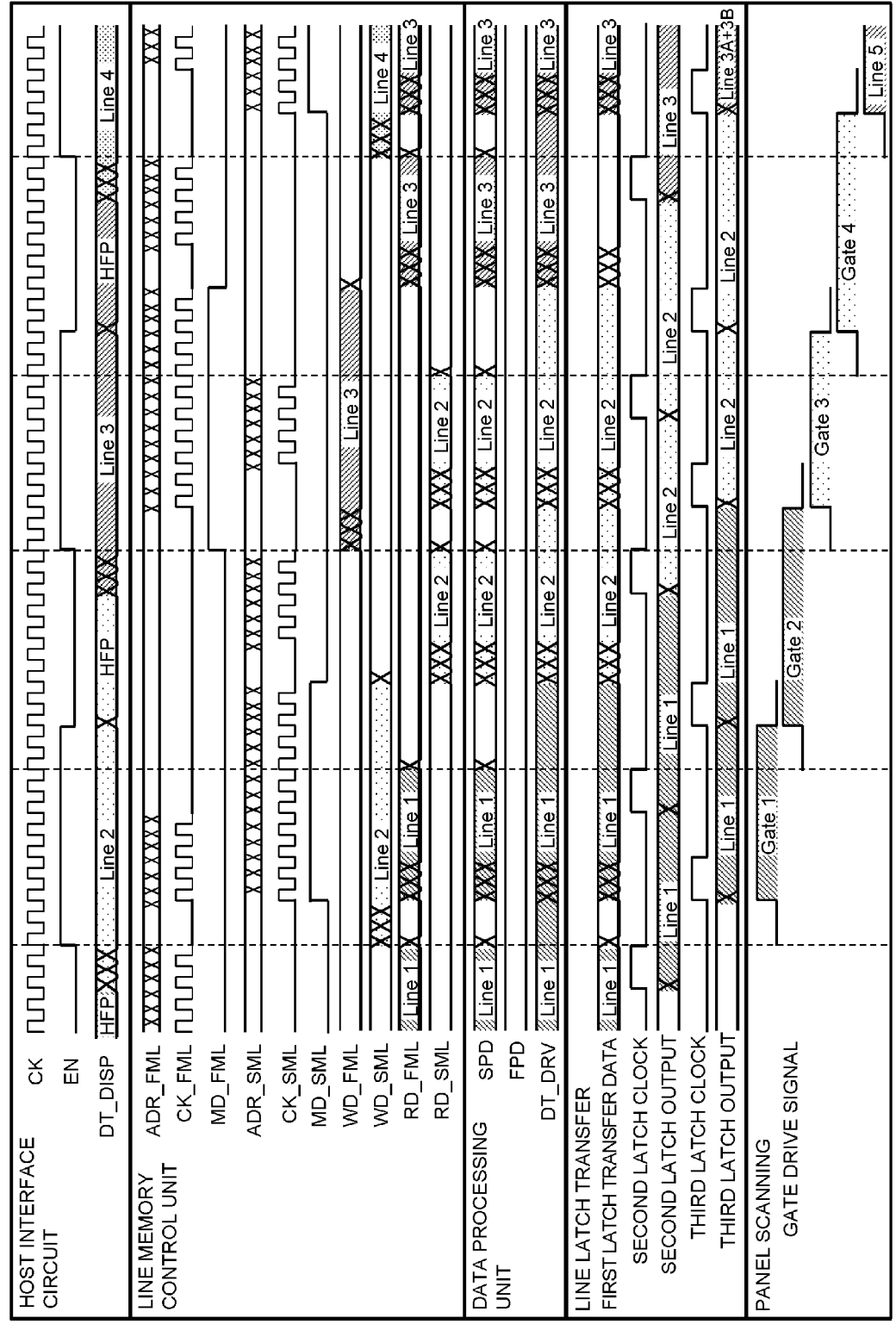
FIG. 5 is a timing diagram illustrating operation timings in a sorting mode for display magnification.

In Paragraph 1, the logic circuit sorts display line data for magnifying an image by reading out display line data corresponding to every display line n times and repeatedly arranging the same pixel data n times in units of pixels (FIGS. 5 and 6).

According to this, it is possible to perform data manipulation for a magnification display in the display driver itself without imposing a load on the host device.

[4] <<Vertical, Horizontal and Oblique Movements of Sub-Pixel Data>>

Figure 8:
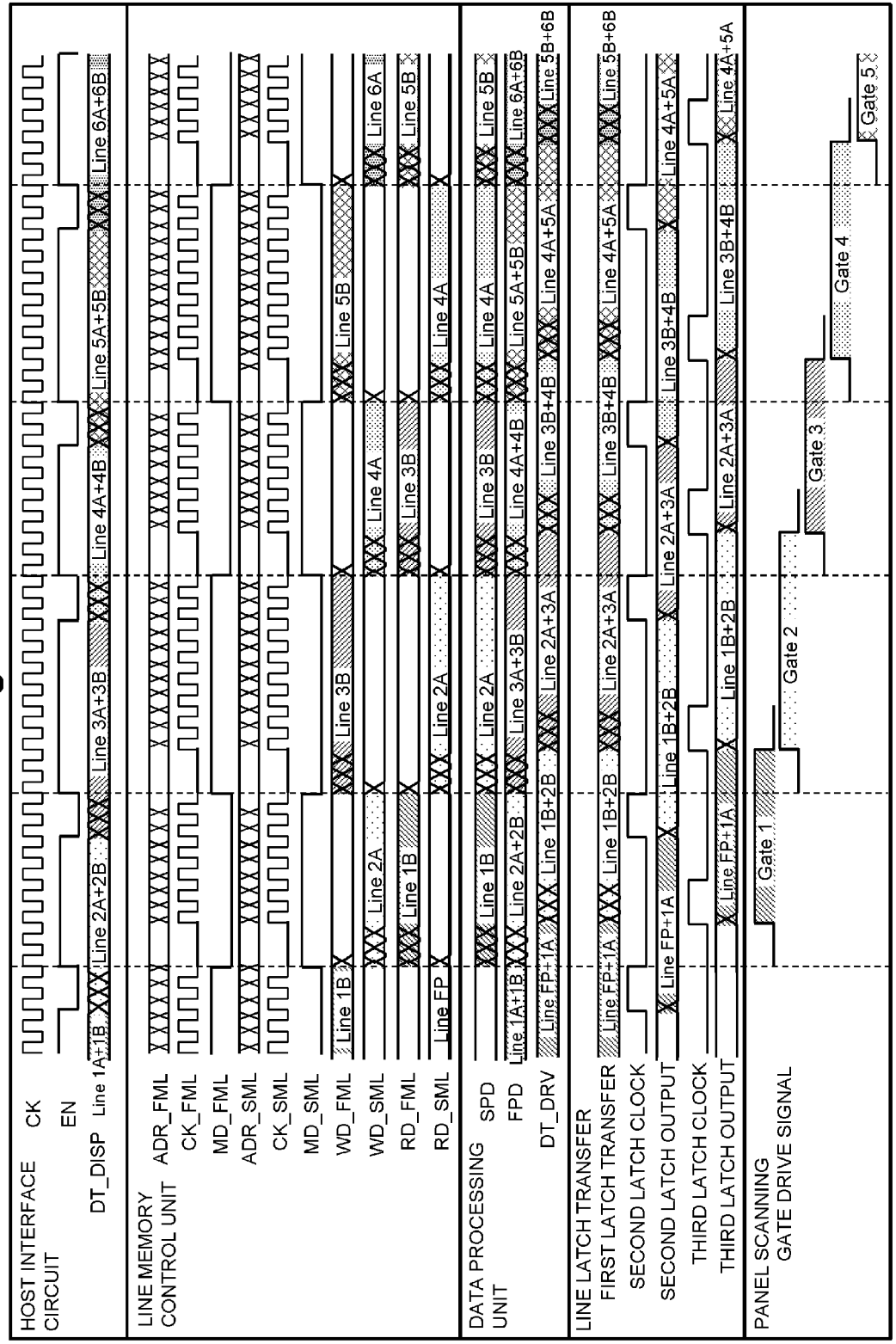
FIG. 8 is a timing diagram illustrating operation timings in case that the sorting of FIG. 7 is performed.

In Paragraph 2, the logic circuit sequentially repeats, until a final display line, a process of sorting sub-pixel data of a first sub-pixel position of first display line data on a second sub-pixel position of second display line data continuous with the first display line data, a process of sorting sub-pixel data of the second sub-pixel position of the second display line data on a second sub-pixel position of third display line data continuous with the second display line data, and a process of moving sub-pixel data of the second sub-pixel position of the third display line data to a first sub-pixel position of the third display line data (FIGS. 7 and 8).

According to this, the vertical, horizontal and oblique movements of the sub-pixel data between the same or adjacent display line data pieces can be achieved in the display driver itself without imposing a load on the host device.

[5] <<Vertical, Horizontal and Oblique Movements of Sub-Pixel Data>>

In Paragraph 2, the logic circuit sequentially repeats, until a final display line, a process of storing sub-pixel data of a first sub-pixel position in the line memory with respect to first display line data which is input to the input circuit, a process of storing sub-pixel data of a second sub-pixel position in the line memory with respect to next second display line data which is input to the input circuit, reading out the sub-pixel data of the first sub-pixel position of the first display line data from the line memory, and sorting the read-out sub-pixel data of the first sub-pixel position of the first display line data on the second sub-pixel position of the second display line data which is input, and a process of storing sub-pixel data of a first sub-pixel position in the line memory with respect to next third display line data which is input to the input circuit, sorting sub-pixel data of a second sub-pixel position of the third display line data which is input on the first sub-pixel position of the third display line data, reading out sub-pixel data of the second sub-pixel position of the second display line data from the line memory, and sorting the read-out sub-pixel data of the second sub-pixel position of the second display line data on the second sub-pixel position of the third display line data which is input (FIG. 7, FIG. 8).

According to this, the vertical, horizontal and oblique movements of the sub-pixel data between the same or adjacent display line data pieces can be achieved in the display driver itself without imposing a load on the host device.

[6] <<Vertical Movement of Sub-Pixel Data>>

In Paragraph 2, the logic circuit sequentially repeats, until a final display line data, a process of sorting sub-pixel data of a first sub-pixel position of first display line data on a first sub-pixel position of next second display line data, and a process of sorting sub-pixel data of the first sub-pixel position of the second display line data continuous with the first display line data on a first sub-pixel position of third display line data continuous with the second display line data.

According to this, the vertical movement of the sub-pixel data between adjacent display line data pieces can be achieved in the display driver itself without imposing a load on the host device (FIG. 9).

[7] <<Vertical and Horizontal Movements of Sub-Pixel Data>>

In Paragraph 2, the logic circuit sequentially repeats, until a final display line data, a process of sorting sub-pixel data of a first sub-pixel position of first display line data on a first sub-pixel position of second display line data continuous with the first display line data, and then right-shifting each sub-pixel data of the display line in units of sub-pixels, a process of sorting sub-pixel data of the first sub-pixel position of the second display line data on a first sub-pixel position of third display line data continuous with the second display line data, and a process of sorting sub-pixel data of the first sub-pixel position of the third display line data on a first sub-pixel position of fourth display line data continuous with the third display line data, and then right-shifting each sub-pixel data of the display line in units of sub-pixels (FIG. 10).

According to this, the vertical and horizontal movements of the sub-pixel data between the same and adjacent display line data pieces can be achieved in the display driver itself without imposing a load on the host device.

[8] <<Vertical and Horizontal Movements of Sub-Pixel Data>>

In Paragraph 2, the logic circuit sequentially repeats, until a final display line data, a process of sorting sub-pixel data of a first sub-pixel position of first display line data on a first sub-pixel position of second display line data continuous with the first display line data, and then left-shifting each sub-pixel data of the display line in units of sub-pixels, a process of sorting sub-pixel data of the first sub-pixel position of the second display line data on a first sub-pixel position of third display line data continuous with the second display line data, and a process of sorting sub-pixel data of the first sub-pixel position of the third display line data on a first sub-pixel position of fourth display line data continuous with the third display line data, and then left-shifting each sub-pixel data of the display line in units of sub-pixels (FIG. 11).

According to this, the vertical and horizontal movements of the sub-pixel data between the same and adjacent display line data pieces can be achieved in the display driver itself without imposing a load on the host device.

[9] <<Even-Numbered/Odd-Numbered Sub-Pixel Positions>>

In any one of Paragraphs 4 to 8, the first sub-pixel position is each sub-pixel position which is even-numbered from a head of the display line data, and the second sub-pixel position is each sub-pixel position which is odd-numbered from the head of the display line data.

According to this, it is possible to simply realize any of the processes in any of Paragraphs 4 to 8 by the line memory including a storage area that stores data of even-numbered sub-pixel positions and a storage area that stores data of odd-numbered sub-pixel positions.

2. Further Detailed Description of the Embodiments

The further detailed description of the embodiments will be given.

<Display Driver>

FIG. 1 shows an example of a display driver. Although not particularly limited, a display driver 1 shown in FIG. 1 is formed in one semiconductor substrate such as single crystal silicon by a CMOS integrated circuit manufacturing technique.

The display driver 1 receives display line data of a plurality of display lines from a host processor 2 serving as a host device to perform drive control on a liquid crystal display panel (also denoted as LCD panel) 3.

Although not specifically shown in the drawing, the liquid crystal display panel 3 is configured as a so-called TFT (Thin Film Transistor) liquid crystal display panel, and is configured such that a plurality of scanning electrodes and common electrodes are formed in an X direction in FIG. 1, a plurality of signal electrodes are formed in a Y direction, and a pixel is formed at each intersection position. One pixel is constituted by, for example, three sub-pixels of RGB. A sub-pixel is configured such that a gate is connected to a scanning electrode, a signal electrode is connected to a source, and one capacitor connected to a common electrode is connected to a drain. This capacitor is a liquid crystal element and is used for holding charge. A common voltage and a scanning drive voltage are applied to the common electrode and the scanning electrode in synchronization with a display scanning timing (horizontal synchronous timing), a gradation drive signal based on display data is provided to the signal electrode for each horizontal synchronous period for each scanning line. Thereby, a light shielding state of a liquid crystal element of a sub-pixel is determined for each display line, and an image is displayed on the liquid crystal display panel 3.

The display driver 1 exhibits a rectangle having a longitudinal side along display line (along the X direction) of the liquid crystal display panel 3. A logic circuit 10, a line memory (LNMRY) 11, and a host interface circuit (HSTIF) 12 serving as an input circuit are arranged at the longitudinal central portion of the display driver 1, and source amplifier circuits 13_A and 13_B and line latch circuits 14_A and 14_B are arranged on both sides thereof. Besides, peripheral circuits 15 such as a power supply circuit, a gradation voltage generation circuit, a reference voltage generation circuit, and a gate drive signal generation circuit are arranged.

The host interface circuit 12 is an input circuit that inputs display line data which is supplied from the host processor 2 serving as a host device. The display line data which is supplied by the host processor 2 is hereinafter referred to as input display line data for the sake of convenience. Although not particularly limited, the input display line data becomes pixel data in order of display lines for image data which is drawn in a frame buffer on the host device side, or stream data such as video data.

The line memory is a memory capable of storing the input display line data which is input to the host interface circuit 12, and is constituted by, for example, a SRAM. The storage capacity thereof includes, for example, a first storage area (first memory line) and a second storage area (second memory line) having the number of storage bits corresponding to the number of sub-pixels of the maximum display line size of the liquid crystal display panel 3 on which display drive is able to be performed by the display driver 1.

The logic circuit 10 controls write and read-out of the input display line data in and from the line memory 11, and performs access control and data processing of sorting the pixel data of the display line data using the input display line data which is received from the host interface circuit 12 and data which is read out from the line memory 11, to thereby generate the display drive data. The display drive data which is output from the logic circuit 10 is provided to the line latch circuits 14_A and 14_B, and the provided display drive data is amplified by the source amplifier circuits 13_A and 13_B in accordance with a display timing. Thereby, the signal electrode of the liquid crystal display panel 3 is driven for each horizontal scanning period in units of display lines. The scanning electrode of the display line is driven by a gate drive signal being sequentially switched for each horizontal scanning period.

Display drive signals (gradation voltage signals) S1 to Sn which are output from each amplifier of the source amplifier circuits 13_A and 13_B correspond to the respective signal electrodes of the liquid crystal display panel 3. Although not specifically shown in the drawing, drive terminals (external output terminals) that output the display drive signals S1 to Sn are arranged along the longitudinal side of the display driver 1 in accordance with the array of the display drive signals S1 to Sn in FIG. 1.

Figure 2:
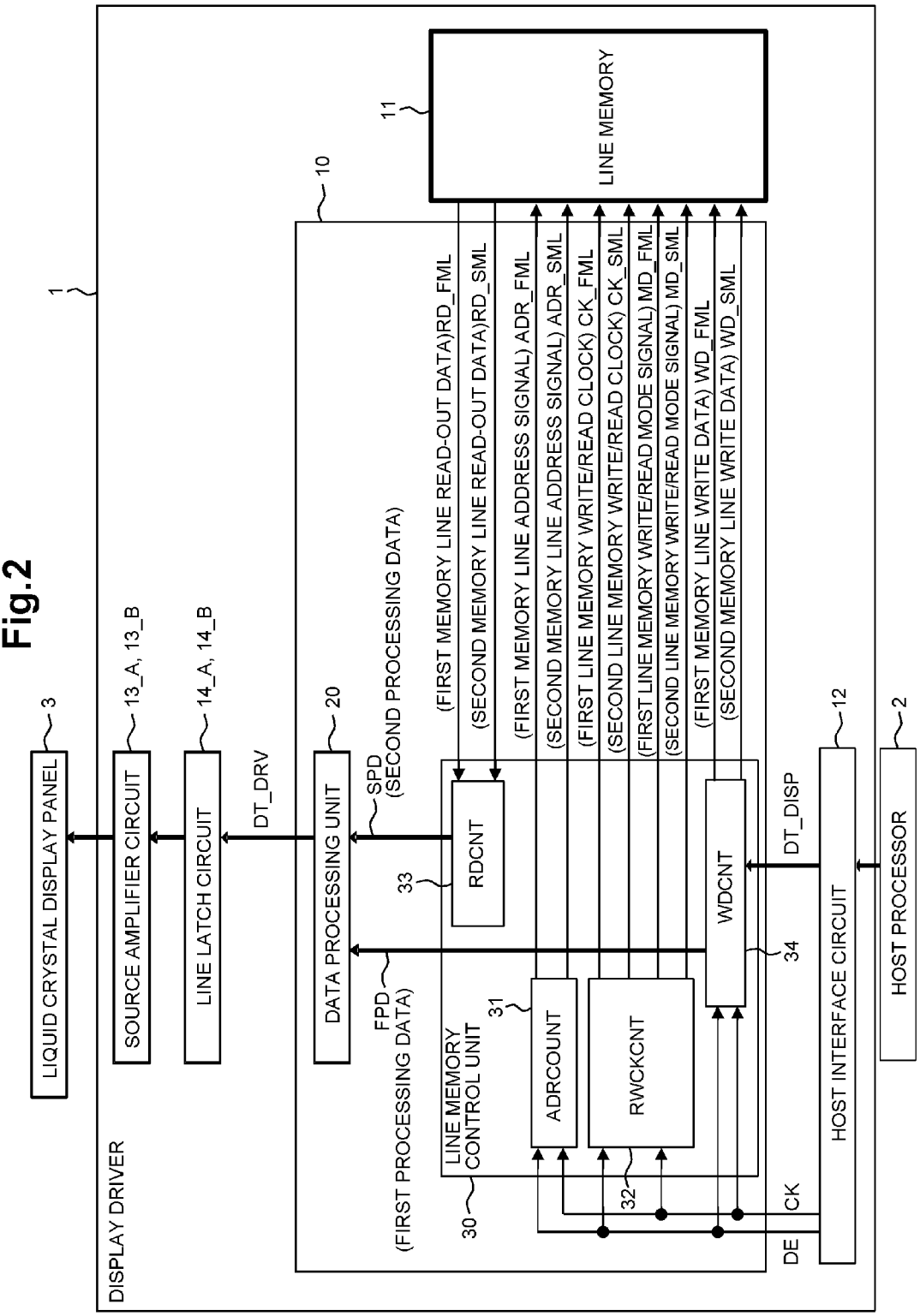
FIG. 2 is a block diagram illustrating a specific example of a logic circuit.

FIG. 2 shows a specific example of the logic circuit. The logic circuit 10 includes a data processing unit 20 and a line memory control unit 30. The line memory control unit 30 includes an address counter (ADRCOUNT) 31, a read and write clock control circuit (RWCKCNT) 32, a read-out data control circuit (RDCNT) 33, and a write data control circuit (WDCNT) 34. The address counter (ADRCOUNT) 31, the read and write clock control circuit (RWCKCNT) 32, and the write data control circuit (WDCNT) 34 operate in synchronization with an operation clock CK which is provided from the host interface circuit 12. The read-out data control circuit (RDCNT) 33 and the data processing unit 20 operate in synchronization with a display operation clock (not shown in the drawing).

In case that the display line data is supplied from the host processor 2, the host interface circuit 12 provides the input display data DT_DISP to the logic circuit 10, and outputs a data enable signal DE which is activated for a data fixing period in units of display lines of the input display data. That is, the data enable signal DE is a signal which is activated for the data fixing period in a display line cycle, and can be generated, for example, on the basis of a horizontal synchronous signal of the input display data.

In case that write in the first memory line (second memory line) of the line memory 11 is performed, the read and write clock control circuit RWCKCNT instructs the line memory 11 to be in a write mode (for example, high level) through a first memory line write and read mode signal MD_FML (second memory line write and read mode signal MD_SML), and in the meantime, specifies a write access cycle by changing a clock of a first memory line write and read clock CK_FML (second memory line write and read clock CK_SML). Further, a first memory line address signal ADR_FML (second memory line address signal ADR_SML) for sequentially specifying memory cells of the first memory line (second memory line) from the address counter (ADRCOUNT) 31 is output to the line memory 11, and the write data control circuit (WDCNT) 34 sequentially outputs a first memory line write data WD_FML (second memory line write data WD_SML) to the line memory 11.

On the other hand, in case that read-out from the first memory line (second memory line) of the line memory 11 is performed, the read and write clock control circuit RWCKCNT instructs the line memory 11 to be in a read mode (for example, low level) through the first memory line write and read mode signal MD_FML (second memory line write and read mode signal MD_SML), and in the meantime, specifies a read-out access cycle by changing the clock of the first memory line write and read clock CK_FML (second memory line write and read clock CK_SML). Further, the first memory line address signal ADR_FML (second memory line address signal ADR_SML) for sequentially specifying the memory cells of the first memory line (second memory line) from the address counter (ADRCOUNT) 31 is output to the line memory 11, and thus a first memory line read-out data RD_FML (second memory line read-out data RD_SML) is sequentially output from the line memory 11 to the read-out data control circuit (RDCNT) 33.

The write data control circuit (WDCNT) 34 can supply the first memory line write data WD_FML (second memory line write data WD_SML) written in the line memory 11 this time as first processing data FPD to the data processing unit 20, and the read-out data control circuit (RDCNT) 33 can supply the first memory line read-out data RD_FML (second memory line read-out data RD_SML) which is read out from the line memory 11 as second processing data SPD to the data processing unit 20. The second processing data SPD becomes data of the next display line of the first processing data FPD.

The data processing unit 20 performs an operation for sorting the sub-pixel data of the input display data using both or one of the first processing data FPD and the second processing data SPD. The sorted data is supplied to the line latch circuits 14_A and 14_B as display drive data DT_DRV for each display line.

Although not particularly limited, an operation mode for sorting the sub-pixel data of the input display data can use appropriate methods such as programmable designation through register setting, designation through a mode terminal, or mode fixing. Here, a detailed description of a configuration for the designation will be omitted. Hereinafter, each sorting operation mode will be described roughly divided into a sorting mode for display magnification and a sorting mode for associating the array of the pixel data with the mapping of the sub-pixels constituting pixels of the liquid crystal display panel 3. The operation modes of the address counter (ADRCOUNT) 31, the read and write clock control circuit (RWCKCNT) 32, the read-out control circuit (RDCNT) 33, and the write control circuit (WTCNT) 34 are also determined in accordance with the sorting operation mode.

<<Sorting for Display Magnification>>

Figure 3:
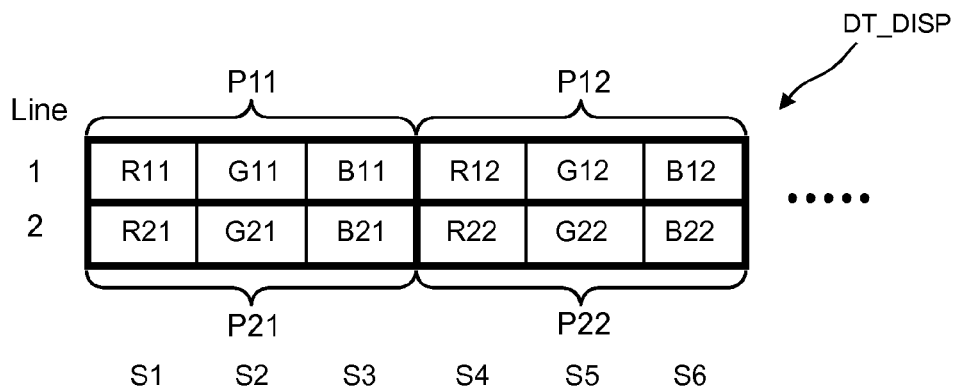
FIG. 3 is a diagram illustrating a portion of input display line data.

FIG. 3 illustrates a portion of the input display line data. Although not particularly limited, in the specification, one pixel is expressed by three-color data of RGB, and one pixel is expressed by three-color sub-pixel data of $R_{xy}$, $G_{xy}$, and $B_{xy}$. In FIG. 3, as the input display line data, first pixel data P11 of a first display line is expressed by sub-pixel data R11, G11, and B11, second pixel data P12 is expressed by sub-pixel data R12, G12, and B12, first pixel data P21 of a second display line is expressed by sub-pixel data R21, G21, and B21, and second pixel data P22 is expressed by sub-pixel data R22, G22, and B22.

In the sorting mode of display magnification, manipulation is performed in which the sorting of the display line data for magnifying an image is performed by reading out the display line data corresponding to every display line n times and repeatedly arranging the same pixel data n times in units of pixels.

Figure 4:
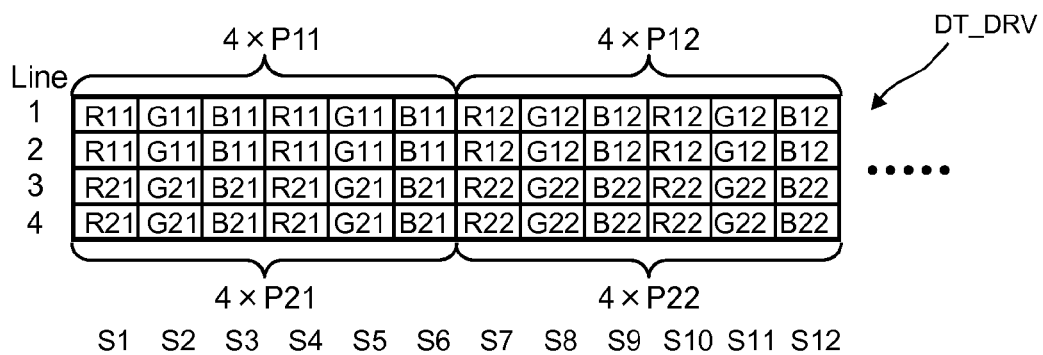
FIG. 4 is a diagram illustrating sorting results for display magnification.

FIG. 4 illustrates sorting results for display magnification. FIG. 4 is an example in which four-times magnification is performed. It is possible to obtain the display drive data DT_DRV magnified by extensively arranging pixel data of one pixel vertically and horizontally. It is natural that the size of the input display line data is equal to or less than ¼ of the maximum display size.

FIG. 5 illustrates operation timings in a sorting mode for display magnification. HFP means a horizontal flyback period. Line 1, Line 2, Line 3 mean input display line data for each display line. In this example, the display line data of odd-numbered display lines is stored in the first memory line, and the display line data of even-numbered display lines is stored in the second memory line. Read-out from the memory lines is performed continuously two times from the same memory line. The data processing unit 20 obtains the display drive data DT_DRV capable of a four-times magnification display by arranging pixel data at intervals of one pixel with respect to first read-out data of the same data, and arranging pixel data corresponding to second read-out data at a blank pixel position.

The drive data DT_DRV is internally transferred from initial-stage latches of the line latch circuits 14_A and 14_B to final-stage latches thereof, and the signal electrode of the liquid crystal display panel 3 is driven by the source amplifier circuits 13_A and 13_B using the display drive data DT_DRV of the final-stage latches in synchronization with a gate drive timing.

<<Sorting Mode for Associating Array of Pixel Data with Sub-Pixel Mapping of Panel>>

FIG. 6 illustrates a portion of the input display line data. Here, in each display line, pixel data of four pixels exemplifies four display lines. The rule of notation is the same as that in FIG. 3.

In the sorting of the pixel data in accordance with the mapping of the sub-pixels of the liquid crystal display panel 3, manipulation is performed in which the display line data which is input to the host interface circuit 12 is stored in the line memory 11, and the pixel data is sorted within the same display line or between adjacent display lines in units of display pixels, using the input display line data and the display line data which is related to a display line immediately before the display line of the display line data and is read out from the line memory 11.

FIG. 7 illustrates results of sorting in which the vertical, horizontal and oblique movements of the sub-pixel data are performed. In FIG. 7, the sorting of the display line data is performed by sequentially repeating, until a final display line, a process of sorting sub-pixel data (G11, R12, B12, . . . ) of even-numbered sub-pixel positions (first sub-pixel positions) of the first display line data on odd-numbered sub-pixel positions (second sub-pixel positions) of the second display line data continuous with the first display line data, a process of sorting sub-pixel data (R21, B21, G22, . . . ) of odd-numbered sub-pixel positions of the second display line data on odd-numbered sub-pixel positions of the third display line data continuous with the second display line data, and a process of sorting sub-pixel data (R31, B31, G32, . . . ) of odd-numbered sub-pixel positions of the third display line data on even-numbered sub-pixel positions of the third display line data.

FIG. 8 illustrates operation timings in case that the sorting of FIG. 7 is performed. Line FP means a vertical flyback period. Line 1A+1B, Line 2A+2B, and Line 3A+3B mean input display line data for each display line. In this case, X in Line XA+XB means the number of display lines, A means odd-numbered sub-pixel data, and B means even-numbered sub-pixel data. In this example, even-numbered sub-pixel data of odd-numbered display lines is stored in the first memory line, and odd-numbered sub-pixel data of even-numbered display lines is stored in the second memory line. Read-out from the memory lines for each enable cycle based on a data enable signal EN is alternately performed between the first memory line and the second memory line. in case that even-numbered sub-pixel data is read out from the line memory 11, the data processing unit 20 sorts the sub-pixel data using the even-numbered sub-pixel data and even-numbered sub-pixel data of the display line data which is input to the host interface circuit 12 at that time. Thereby, sorting as shown in the second display line of FIG. 7 is performed. On the other hand, in case that odd-numbered sub-pixel data is read out from the line memory 11, the data processing unit 20 sorts the sub-pixel data using the odd-numbered sub-pixel data and odd-numbered sub-pixel data of the display line data which is input to the host interface circuit 12 at that time. Thereby, sorting as shown in the third display line of FIG. 7 is performed. Such manipulation is repeated, thereby allowing the display drive data DT_DRV sorted as shown in FIG. 7 to be obtained.

The drive data DT_DRV is internally transferred from initial-stage latches of the line latch circuits 14_A and 14_B to final-stage latches thereof, and the signal electrode of the liquid crystal display panel is driven by the source amplifier circuits 13_A and 13_B using the display drive data DT_DRV of the final-stage latches in synchronization with a gate drive timing.

The further detailed description of a sorting method of FIG. 7 performed by the logic circuit 10 will be given. The sub-pixel data of the even-numbered sub-pixel positions with respect to the first display line data which is input to the host interface circuit 12 is stored in the line memory 11. The sub-pixel data of the odd-numbered sub-pixel positions with respect to the next second display line data which is input to the host interface circuit 12 is stored in the line memory 11, the sub-pixel data of the even-numbered sub-pixel positions of the first display line data is read out from the line memory 11, and the read-out sub-pixel data is sorted on the odd-numbered sub-pixel positions of the second display line data which is input at that time. The sub-pixel data of the even-numbered sub-pixel positions with respect to the next third display line data which is input to the host interface circuit 12 is stored in the line memory 11, the sub-pixel data of the odd-numbered sub-pixel positions of the third display line data which is input is sorted on the even-numbered sub-pixel positions of the third display line data, the sub-pixel data of the odd-numbered sub-pixel positions of the second display line data is readout from the line memory, and the read-out sub-pixel data is sorted on the odd-numbered sub-pixel positions of the third display line data which is input this time. The sorting of the display line data is performed by sequentially repeating these processing until a final display line.

FIG. 9 illustrates results of sorting in which the vertical movement of the sub-pixel data is performed. In FIG. 9, the sorting of the display line data is performed by sequentially repeating, until final display line data, a process of sorting the sub-pixel data of the even-numbered sub-pixel positions of the first display line data on the even-numbered sub-pixel positions of the next second display line data, and a process of sorting the sub-pixel data of the even-numbered sub-pixel positions of the second display line data continuous with the first display line data on the even-numbered sub-pixel positions of the third display line data continuous with the second display line data.

FIG. 10 illustrates results of sorting in which the vertical and horizontal movements of the sub-pixel data are performed. In FIG. 10, the sorting of the display line data is performed by sequentially repeating, until final display line data, a process of sorting the sub-pixel data of the even-numbered sub-pixel positions of the first display line data on the even-numbered sub-pixel positions of the second display line data continuous with the first display line data, and then right-shifting each sub-pixel data of the display line in units of sub-pixels, a process of sorting the sub-pixel data of the even-numbered sub-pixel positions of the second display line data on the even-numbered sub-pixel positions of the third display line data continuous with the second display line data, and a process of sorting the sub-pixel data of the even-numbered sub-pixel position of the third display line data on the even-numbered sub-pixel positions of fourth display line data continuous with the third display line data, and then right-shifting each sub-pixel data of the display line in units of sub-pixels.

FIG. 11 illustrates other results of sorting in which the vertical and horizontal movements of the sub-pixel data are performed. In FIG. 11, the sorting of the display line data is performed by sequentially repeating, until final display line data, a process of sorting the sub-pixel data of the even-numbered sub-pixel positions of the first display line data on the even-numbered sub-pixel positions of the second display line data continuous with the first display line data, and then left-shifting each sub-pixel data of the display line in units of sub-pixels, a process of sorting the sub-pixel data of the even-numbered sub-pixel positions of the second display line data on the even-numbered sub-pixel position of the third display line data continuous with the second display line data, and a process of sorting the sub-pixel data of the even-numbered sub-pixel positions of the third display line data on the even-numbered sub-pixel positions of the fourth display line data continuous with the third display line data, and then left-shifting each sub-pixel data of the display line in units of sub-pixels.

In case that the sorting of FIGS. 10 and 11 is performed, the even-numbered sub-pixel data of the display line data provided to the host interface circuit 12 and the odd-numbered sub-pixel data which is related to the previous display line and is read out from the line memory 11 are required, and thus it is necessary to store the odd-numbered sub-pixel data of each display line in the line memory 11.

According to the above embodiment, the following effects are obtained.

According to the display driver 1 of FIG. 1, the logic circuit 10 and the line memory 11 are used, thereby allowing the sorting of the pixel data in the input display line data to be performed without requiring a complicated configuration for adding a large number of circuit elements to a narrow place in which the number of latch stages of the line latch circuits 14_A and 14_B which are arranged along drive terminals that output the drive signals S1 to Sn is increased or a large number of multiplexers are arranged in a transfer path between latch stages. In addition, it is possible to reduce a layout area of the display driver 1 as compared to a case where such a complicated configuration is adopted. Moreover, there is no concern of a considerable increase in occupation area as in case that a frame memory is adopted in the display driver 1. Further, the array of the pixel data of the display line data can be changed on the display driver 1 side. That is, it is possible to increase the degree of freedom of data processing on the display driver 1 side, and to contribute to a reduction in a load of the host processor 2.

According to the methods described in FIGS. 7 and 8, the array of the pixel data can be associated with the mapping of the sub-pixels constituting the pixels of the liquid crystal display panel 3, in the display driver 1 itself without imposing a load on the host processor 2. For example, the same sorting as the vertical, horizontal and oblique movements of the sub-pixel data between the same or adjacent display line data pieces can be achieved in the display driver 1 itself without imposing a load on the host processor 2. Besides, the same sorting as the vertical movement of the sub-pixel data between adjacent display line data pieces or the same sorting as the vertical and horizontal movements of the sub-pixel data between the same and adjacent display line data pieces can be achieved.

Further, according to the methods described in FIGS. 4 and 5, it is possible to perform data manipulation for a magnification display, in the display driver 1 itself without imposing a load on the host processor 2.

It goes without saying that the present invention is not limited to the above embodiment, and various modifications and changes can be made without departing from the scope of the invention.

For example, the sub-pixel data may be each sub-pixel data of a blue color difference component, a red color difference component, and a luminance component, without being limited to each data of RGB.

The display driver can also be realized as a semiconductor device in which a touch panel controller that controls a detection operation of a touch panel using an electrostatic capacitance system or the like is on-chipped.

The pattern of sorting of the sub-pixels is not limited to the above embodiments, and can be appropriately changed.

The display panel is not limited to a liquid crystal display panel, and may be a plasma display panel, an electroluminescent display panel and the like.

What is claimed is:

1. A display driver that receives display line data of a plurality of display lines to perform drive control on a display panel, comprising:
    an input circuit that inputs display line data which is supplied from outside the display driver;
    a line memory capable of storing the display line data which is input to the input circuit;
    a logic circuit that controls write and read-out of the display line data in and from the line memory, and sorts pixel data of the display line data using data which is read out from the line memory, to generate display drive data; and
    drive circuits that drive the display panel in units of display lines on the basis of the drive data which is output from the logic circuit,
    wherein the drive circuits are separately arranged on both sides of the logic circuit and the line memory which are interposed therebetween,
    wherein the line memory has a storage capacity corresponding to a number of lines smaller than a number of display lines of a display frame,
    wherein the logic circuit stores the display line data which is input to the input circuit in the line memory, sorts the pixel data within the same display line or between adjacent display lines in units of display pixels, using the input display line data and display line data which is related to a display line immediately preceding the display line of the display line data and is read out from the line memory, and generates the display drive data in units of display lines, to thereby associate an array of the pixel data with mapping of sub-pixels constituting pixels of the display panel, and
    wherein the display drive data in each line contains part of the pixel data of a primary display line and part of the pixel data of an adjacent display line immediately preceding the primary display line.

2. The display driver according to claim 1, wherein the logic circuit sorts display line data for magnifying an image by reading out display line data corresponding to every display line n times and repeatedly arranging the same pixel data n times in units of pixels.

3. The display driver according to claim 1,
    wherein the logic circuit sequentially repeats, until a final display line:
        a process of storing sub-pixel data of even-numbered sub-positions in the line memory with respect to first display line data which is input to the Input circuit;
        a process of storing sub-pixel data of odd-numbered sub-pixel positions in the line memory with respect to next second display line data which is input to the input circuit, reading out the sub-pixel data of even-numbered sub-pixel positions of the first display line data from the line memory, and sorting the read-out sub-pixel data of even-numbered sub-pixel positions of the first display line data on odd-numbered sub-pixel positions of the second display line data which is input; and a process of storing sub-pixel data of even-numbered sub-pixel positions in the line memory with respect to next third display line data which is input to the input circuit, sorting sub-pixel data of odd-numbered sub-pixel positions of the third display line data which is input on even-numbered sub-pixel positions of the third display line data, reading out sub-pixel data of odd-numbered sub-pixel positions of the second display line data from the line memory, and sorting the read-out sub-pixel data of odd-numbered sub-pixel positions of the second display line data on odd-numbered sub-pixel positions of the third display line data which is input.

4. The display driver according to claim 1, wherein the logic circuit sequentially repeats, until a final display line, a process of sorting sub-pixel data of an even-numbered sub-pixel position of first display line data on an odd-numbered sub-pixel position of second display line data continuous with the first display line data, a process of sorting sub-pixel data of the an odd-numbered sub-pixel position of the second display line data on an odd-numbered sub-pixel position of third display line data continuous with the second display line data, and a process of sorting sub-pixel data of an odd-numbered sub-pixel position of the third display line data to an even-numbered sub-pixel position of the third display line data.

5. The display driver according to claim 4, wherein the first sub-pixel position is each sub-pixel position which is even-numbered from a head of the display line data, and the second sub-pixel position is each sub-pixel position which is odd-numbered from the head of the display line data.

6. The display driver according to claim 1, wherein the logic circuit sequentially repeats, until a final display line data, a process of sorting sub-pixel data of a first sub-pixel position of first display line data on a first sub-pixel position of next second display line data, and a process of sorting sub-pixel data of the first sub-pixel position of the second display line data continuous with the first display line data on a first sub-pixel position of third display line data continuous with the second display line data.

7. The display driver according to claim 6, wherein the first sub-pixel position is each sub-pixel position which is even-numbered from a head of the display line data, and the second sub-pixel position is each sub-pixel position which is odd-numbered from the head of the display line data.

8. A display driver that receives display line data of a plurality of display lines to perform drive control on a display panel, comprising:
an input circuit that inputs display line data which is supplied from outside the display driver;
a line memory capable of storing the display line data which is input to the input circuit;
a logic circuit that controls write and read-out of the display line data in and from the line memory, and sorts pixel data of the display line data using data which is read out from the line memory, to generate display drive data; and drive circuits that drive the display panel in units of display lines on the basis of the drive data which is output from the logic circuit,
wherein the drive circuits are separately arranged on both sides of the logic circuit and the line memory which are interposed therebetween,
wherein the line memory has a storage capacity corresponding to a number of lines smaller than a number of display lines of a display frame,
wherein the logic circuit stores the display line data which is input to the input circuit in the line memory, sorts the pixel data within the same display line or between adjacent display lines in units of display pixels, using the input display line data and display line data which is related to a display line immediately preceding the display line of the display line data and is read out from the line memory, and generates the display drive data in units of display lines, to thereby associate an array of the pixel data with mapping of sub-pixels constituting pixels of the display panel, and
wherein the logic circuit sequentially repeats, until a final display line a process of storing sub-pixel data of a first sub-position in the line memory with respect to first display line data which is input to the input circuit;

a process of storing sub-pixel data of a second sub-pixel position in the line memory with respect to next second display line data which is input to the input circuit, reading out the sub-pixel data of the first sub-pixel position of the first display line data from the line memory, and sorting the read-out sub-pixel data of the first sub-pixel position of the first display line data on the second sub-pixel position of the second display line data which is input; and a process of storing sub-pixel data of a first sub-pixel position in the line memory with respect to next third display line data which is input to the input circuit, sorting sub-pixel data of a second sub-pixel position of the third display line data which is input on the first sub-pixel position of the third display line data, reading out sub-pixel data of the second sub-pixel position of the second display line data from the line memory, and sorting the read-out sub-pixel data of the second sub-pixel position of the second display line data on the second sub-pixel position of the third display line data which is input.

9. The display driver according to claim 8, wherein the first sub-pixel position is each sub-pixel position which is even-numbered from a head of the display line data, and the second sub-pixel position is each sub-pixel position which is odd-numbered from the head of the display line data.

10. A display driver that receives display line data of a plurality of display lines to perform drive control on a display panel, comprising:
an input circuit that inputs display line data which is supplied from outside the display driver;
a line memory capable of storing the display line data which is input to the input circuit;
a logic circuit that controls write and read-out of the display line data in and from the line memory, and sorts pixel data of the display line data using data which is read out from the line memory, to generate display drive data; and
drive circuits that drive the display panel in units of display lines on the basis of the drive data which is output from the logic circuit, wherein the drive circuits are separately arranged on both sides of the logic circuit and the line memory which are interposed therebetween, wherein the line memory has a storage capacity corresponding to a number of lines smaller than a number of display lines of a display frame, wherein the logic circuit stores the display line data which is input to the input circuit in the line memory, sorts the pixel data within the same display line or between adjacent display lines in units of display pixels, using the input display line data and display line data which is related to a display line immediately preceding the display line of the display line data and is read out from the line memory, and generates the display drive data in units of display lines, to thereby associate an array of the pixel data with mapping of sub-pixels constituting pixels of the display panel, and wherein the logic circuit sequentially repeats, until a final display line data a process of sorting sub-pixel data of a first sub-pixel position of first display line data on a first sub-pixel position of second display line data continuous with the first display line data, and then right-shifting each sub-pixel data of the display line in units of sub-pixels;

a process of sorting sub-pixel data of the first sub-pixel position of the second display line data on a first sub-pixel position of third display line data continuous with the second display line data; and a process of sorting sub-pixel data of the first sub-pixel position of the third display line data on a first sub-pixel position of fourth display line data continuous with the third display line data, and then right-shifting each sub-pixel data of the display line in units of sub-pixels.

11. The display driver according to claim 10, wherein the first sub-pixel position is each sub-pixel position which is even-numbered from a head of the display line data, and the second sub-pixel position is each sub-pixel position which is odd-numbered from the head of the display line data.

12. A display driver that receives display line data of a plurality of display lines to perform drive control on a display panel, comprising:

an input circuit that inputs display line data which is supplied from outside the display driver;

a line memory capable of storing the display line data which is input to the input circuit;

a logic circuit that controls write and read-out of the display line data in and from the line memory, and sorts pixel data of the display line data using data which is read out from the line memory, to generate display drive data; and drive circuits that drive the display panel in units of display lines on the basis of the drive data which is output from the logic circuit, wherein the drive circuits are separately arranged on both sides of the logic circuit and the line memory which are interposed therebetween, wherein the line memory has a storage capacity corresponding to a number of lines smaller than a number of display lines of a display frame, wherein the logic circuit stores the display line data which is input to the input circuit in the line memory, sorts the pixel data within the same display line or between adjacent display lines in units of display pixels, using the input display line data and display line data which is related to a display line immediately preceding the display line of the display line data and is read out from the line memory, and generates the display drive data in units of display lines, to thereby associate an array of the pixel data with mapping of sub-pixels constituting pixels of the display panel, and wherein the logic circuit sequentially repeats, until a final display line data a process of sorting sub-pixel data of a first sub-pixel position of first display line data on a first sub-pixel position of second display line data continuous with the first display line data, and then left-shifting each sub-pixel data of the display line in units of sub-pixels;

a process of sorting sub-pixel data of the first sub-pixel position of the second display line data on a first sub-pixel position of third display line data continuous with the second display line data; and a process of sorting sub-pixel data of the first sub-pixel position of the third display line data on a first sub-pixel position of fourth display line data continuous with the third display line data, and then left-shifting each sub-pixel data of the display line in units of sub-pixels.

13. The display driver according to claim 12, wherein the first sub-pixel position is each sub-pixel position which Is even-numbered from a head of the display line data, and the second sub-pixel position is each sub-pixel position which is odd-numbered from the head of the display line data.

* * * * *